Sept. 2, 1952 M. E. P. STUDDERT 2,608,922
REFLEX CAMERA WITH CURTAIN SHUTTER
Filed July 10, 1950 6 Sheets-Sheet 1

Inventor
Maurice Eyre Persse Studdert
By
Emery Holcombe & Blair
Attorney

Inventor
Maurice Eyre Persse Studdert
By Emery, Holcombe & Blau
Attorney

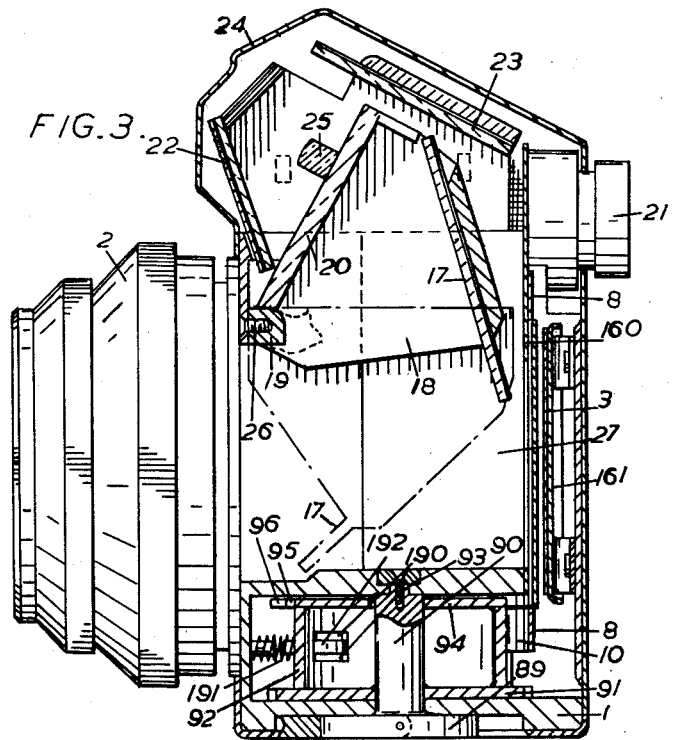
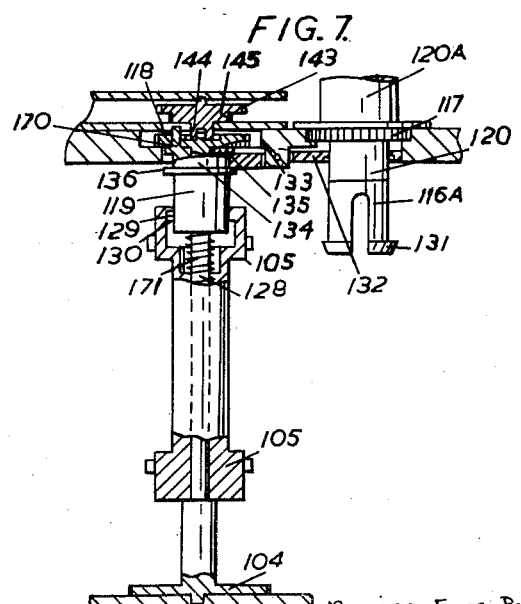

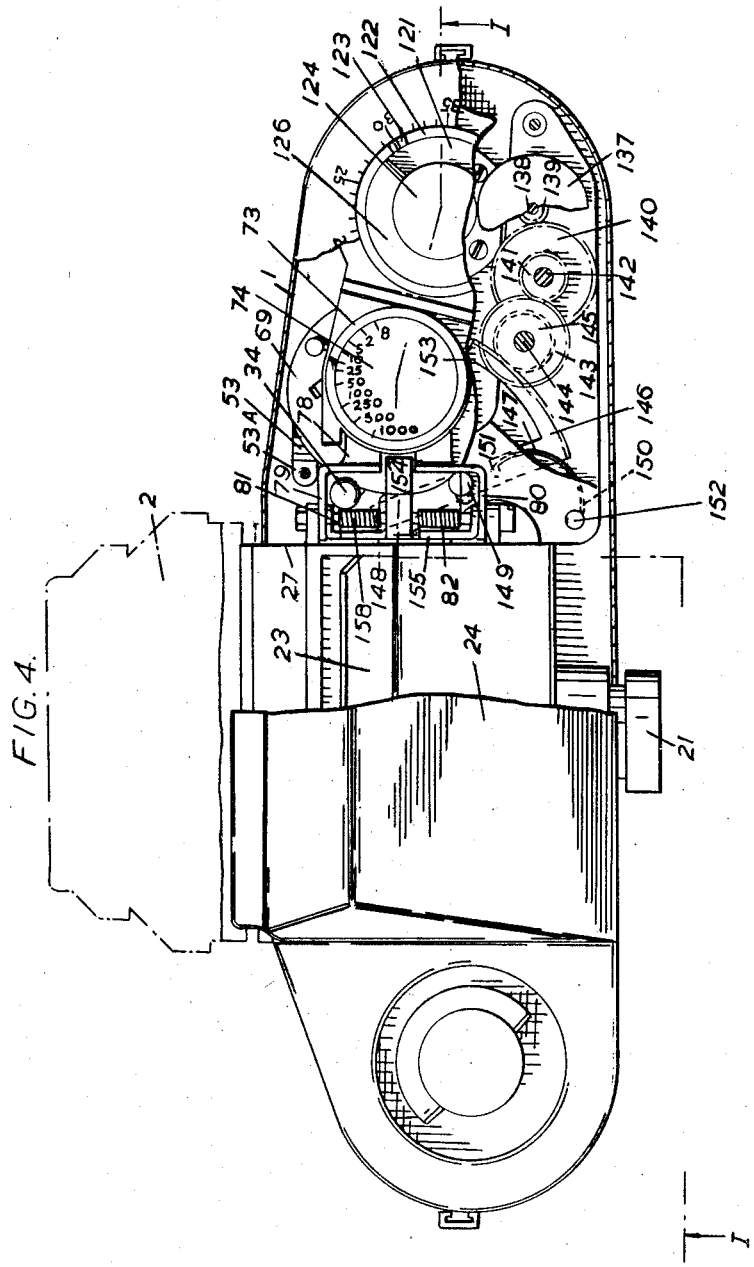

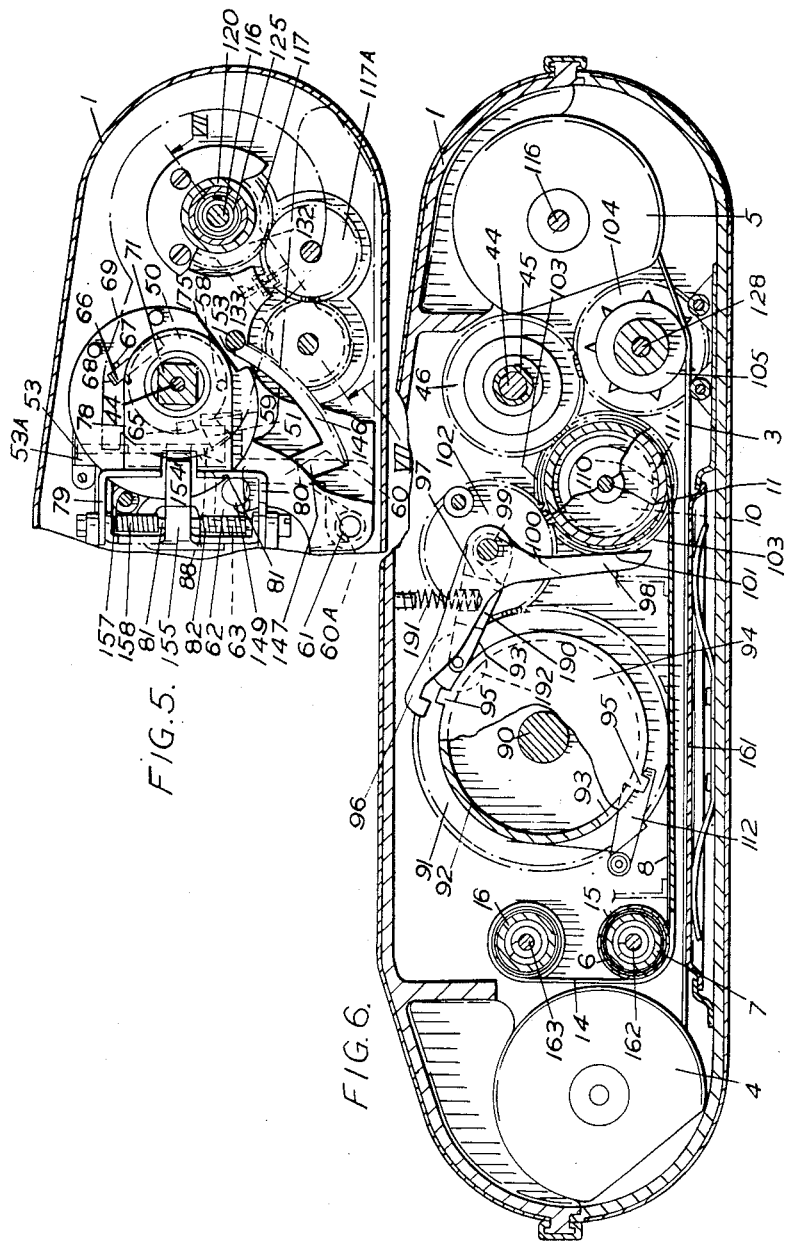

Patented Sept. 2, 1952

2,608,922

UNITED STATES PATENT OFFICE 2,608,922

REFLEX CAMERA WITH CURTAIN SHUTTER

Maurice Eyre Persse Studdert, Oldcourt, Waterford, Eire; Helena Ruth Katie Studdert, executrix of said Maurice Eyre Persse Studdert, deceased, assignor to Wray (Cameras) Limited, Bromley, England, a British company Application July 10, 1950, Serial No. 172,858
In Great Britain July 13, 1949

11 Claims. (Cl. 95—42)

1

This invention relates to photographic cameras, and more particularly to cameras in which the shutter consists of two shutter blinds one of which initially covers the sensitive surface and is wound up on making an exposure so as to uncover the sensitive surface, and a second shutter blind which is subsequently released and follows the first and is drawn over the sensitive surface to terminate the exposure.

The exposure given by such a shutter is dependent on the speed of travel of the blinds and the interval of time between the release of the first and the second, or follow-up, blind. The main object of the present invention is to provide a mechanism which gives a very wide range of time intervals which are infinitely variable from the longest to the shortest exposure. Another object of the invention is to provide a shutter release mechanism in which the timing of the release of the two shutter blinds is determined by an independent spring motor so that the interval between the release of the two shutter blinds is not dependent on the speed of travel of the first shutter blind.

According to the invention, the two blinds are released successively by the action of a shutter release member driven by an independent spring motor which is rewound after each exposure. This member is released to initiate an exposure and revolves under the action of its motor spring through substantially one revolution, during which revolution a projection carried by it first engages a member to release the first shutter blind at an unvarying point in the rotation of the member and then a part of the shutter release member engages a member which can be moved to alter the point in the revolution at which it is engaged and which acts to release the second shutter blind. By this means, the interval between the release of the first and second shutter blinds can be varied and, in addition, the interval can be further varied by altering the speed at which the shutter release member rotates between the release of the first and second blinds. This is brought about, according to the invention, by retarding the shutter release member during a variable part of its revolution, when longer exposures are required, by bringing into driving engagement with it a mechanism which serves to stress a governor spring and also drives a gear train and flywheel having substantial inertia compared with the shutter release member.

The shutter release member may conveniently take the form of a wheel or disc having a projection on its periphery which is engaged by a detent to prevent it revolving and a pin on its under surface which engages the first shutter blind release lever. The second shutter blind release lever is tripped by a wedge-shaped cam surface on the upper face of the disc which engages one side of a tappet which is pivoted in a slot in a cam plate lying in a plane parallel to the shutter release disc and adjustable about the axis of rotation of that disc. Engagement of the wedge cam with the tappet pushes the latter part way through the slot so that its upper side presses against the face of a plate lying close to and parallel with the cam plate and forming part of the second shutter blind release lever, so that when the wedge cam engages the tappet, the latter moves the second shutter blind release lever and this blind is released.

In a reflex camera, it is desirable that the shutter release member should be tripped by the mirror when it has been swung out of the exposure chamber, thus ensuring that the shutter is not released while the mirror is still in the way. It is then convenient for the action of restoring the mirror to the viewing position to accompany and be an incident in the restressing of the shutter release member spring motor and the rewinding of the shutters.

An example of a reflex camera according to the invention in which this arrangement is adopted is illustrated in the accompanying drawings, in which:

Figure 3 is a vertical transverse section on the line III—III in Figure 1;

Figure 4 is a plan of the camera shown in Figure 1 with part of the top plate cut away to show the shutter release mechanism;

Figure 5 is a similar view to the right-hand end of Figure 4 with the cover plate removed and showing details of the release mechanism;

Figure 6 is a horizontal transverse section on the line VI—VI in Figure 1;

Figure 7 is a vertical section on the line VII—VII in Figure 5; and

Figure 1:
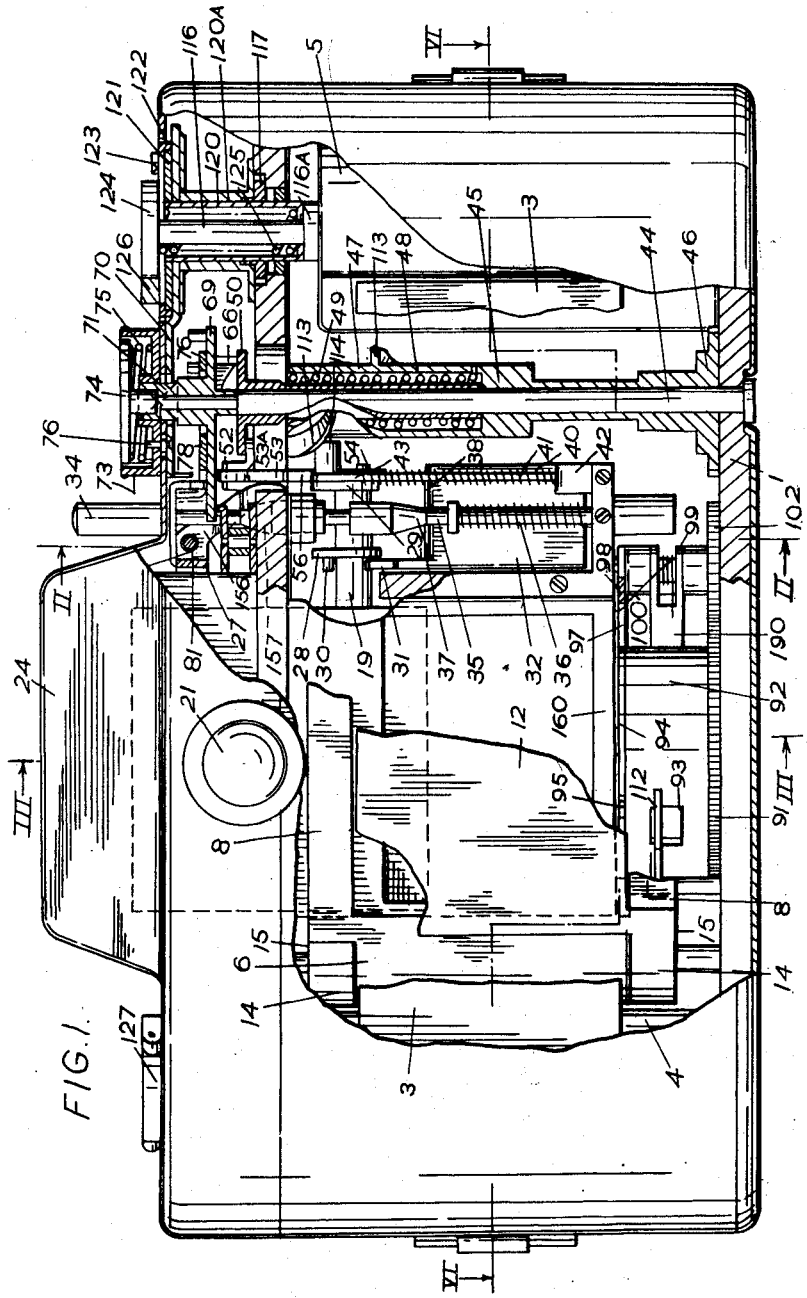
Figure 1 is a rear view of a complete reflex camera with part of the back cut away to show the mechanism, part of which is in section on the line I—I in Figure 4.

As seen in Figs. 1, 3 and 4, the camera consists of a die-cast body 1 having at its front a focussing mounting 2, of a conventional type, for the objective lens. The film 3 passes across the back of the camera from the cassette 4 (Figure 6) to the cassette 5, being held flat by a pressure plate 161. The first shutter blind 6 is shown in Figure 1, after an exposure and before rewinding, wound on the spring-loaded roller 7 (Figure 6) mounted on the shaft 162 and connected by upper and lower ribbons 8 to upper and lower pulleys 9, 10 (Figure 2) on a vertical spindle 11 at the opposite side of the exposure space from which the blinds are separated by a mask 160. The second shutter blind 12 is connected to a roller 13 on the vertical shaft 11 between the pulleys 9 and 10 and has ribbons 14 which pass round idle rollers 15 above and below the spring-loaded roller 7 and are connected to a spring-loaded roller 16 on a shaft 163 parallel to the roller 15 (Figure 6).

The reflex system of the camera is seen best in Figure 3 and comprises a mirror 17 mounted in a frame 18 itself mounted on a horizontal transverse shaft 19 journalled in lugs 26 on the body. This frame 18 also carried a ground glass screen 20 and, for viewing, the frame 18 together with the mirror 17 and ground glass screen 20, are lowered into the position shown in dotted outline in Figure 3. The mirror 17 then reflects light from the camera objective 2 and an image is formed on the ground glass screen 20, which is then horizontal, and the image is viewed through an eyepiece 21 in the rear wall of the camera by way of mirrors 22 and 23 which are housed in a metal pressing 24 mounted on the top of the camera body 1. A small magnifying lens 25 of short focal length is cemented to the upper surface of the ground glass screen 20 so that it is seen in the field of view of the eyepiece 21 slightly below the centre of the picture, and gives a highly magnified image of the corresponding part of the picture enabling the camera to be focussed very accurately.

The shaft 19 extends to the right in Figure 1 through the wall 27 of the exposure chamber and, at its end, carries two similar parallel arms 28 and 29 (Figure 1). The arm 28 shown partly broken away in Figure 2, carries at its extremity a pin 30 and when the mirror 17 is lowered into the viewing position, this pin is engaged by a hook 31 carried by a member 32 pivoted at 33, so that the mirror is retained in the viewing position. The mirror 17 is released by pressure on the trigger button 34, which is the upper end of a trigger rod 35 sliding vertically in the body 1 and biassed upwards by a spring 36 engaging below a collar 35a on the rod 35. The latter has a coned portion 37 and when the button 34 is depressed, this engages a turned-over lip 38 at the upper end of the member 32 (Figure 1), which is thus urged against the action of a leaf spring 39 towards the left in Figure 2, that is towards the front of the camera. This has the effect of disengaging the hook 31 from the pin 30, leaving the mirror 17 and screen 20 free to be moved into their upper position for making an exposure under the action of a compression spring 40 coiled round a rod 41 pivoted to the arm 29. The lower end of this spring 40 bears against an apertured plate 42 and the upper end bears against a shoulder 43 on the rod 41 so that the rod 41, which slides through the plate 42, is urged upwards to drive the mirror into the position shown in Figure 3, and this action is used to release the shutter timing mechanism as will be described later.

Figure 2:
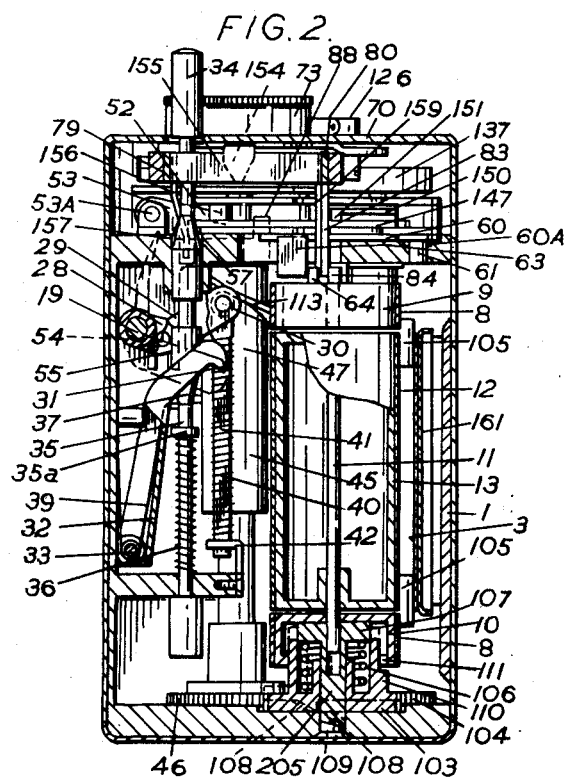
Figure 2 is a vertical transverse section on the line II—II in Figure 1.
Figure 8:
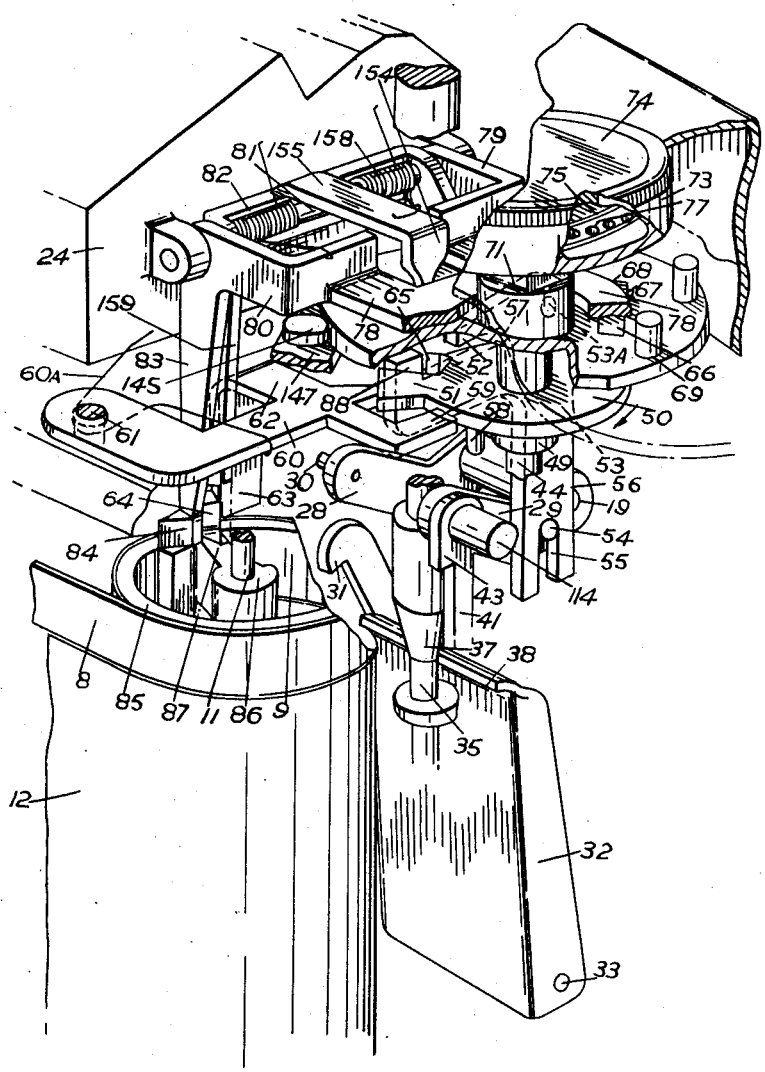
Figure 8 is a rear perspective view of the shutter release mechanism.

The spring motor for the shutter timing mechanism is mounted on a stationary vertical rod 44 (Figure 1) secured in the base of the case 1 and having mounted freely thereon a cam member 45 which is formed integrally with a spur wheel 46 at its lower end and is formed as a cylindrical housing 47 at its upper end. This cylindrical housing 47 contains a coiled torsion spring 48, which is secured to the member 45 at its lower end and at its upper end is secured to a sleeve 49 freely journalled on the rod 44. This sleeve 49 has a large flange at its upper end forming the disc 50 which performs the exposure timing action of the mechanism. To this end, it is formed with a projection 51 on its periphery (Figure 5) which, when the mechanism is fully wound, is engaged by the tip of an arm 52 of a member 53 pivoted at 53A (Figure 2). When an exposure is made, the mirror is released as has already been described and is turned into its upper position and, as this movement occurs, a pin 54 carried by the arm 29 and engaging in a slot 55 of a downwardly extending arm 56 of the member 53, turns with the shaft 19 and rocks the member 53 about its pivot 53A so that the tip of the arm 52 is raised clear of the projection 51 on the wheel 50 so that the projection 51 is free to turn through a slot 57 formed in the member 53 beneath the arm 52 (Figures 2 and 8). The disc 50 is driven by the spring 48 in a clockwise direction, as seen from above, and after the release of the projection 51, it turns freely through about fifty degrees until a pin 58 (Figures 5 and 8) projecting from the underside of the disc 50 engages the end of an arm 59 of the first shutter blind release lever 60 which is pivoted at 61 to turn in a horizontal plane. This lever 60 has a second arm 62 which is turned downwards at 63 to engage a stop 64 on the rim of the shutter ribbon pulley 9. The pin 58 turns the lever 60 against the action of a spring 60A and thus the arm 62 disengages the stop 64 and releases the pulley 9 so that the first shutter blind 6 is released to uncover the sensitised surface of the film 3 and to commence the exposure.

After tripping the first shutter as described, the disc 50 continues its revolution until a wedge-shaped cam or ramp 65 on its upper face engages the underside of the free end of a tappet 66 pivoted at 67 to turn about a horizontal axis in a slot 68 of a horizontal cam plate 69. This plate 69 is mounted to turn freely on the upper end of the rod 44 and has a central boss which projects through the top plate 70 of the body 1, where its upper end is squared at 71 to fit a square central hole in a cup-shaped finger wheel 73. The rod 44 extends through the centre of this square end and the cup-shaped wheel, and terminates in a circular plate 74 against which the upper end of a coiled compression spring 75 presses. The lower end of this spring 75 presses against the inner surface of the cup 73 pressing the cup into contact with the top surface of the body 1. This upper surface of the body 1 carries a pin 76 which engages in one of a number of holes 72 drilled in the cup 73 (Figure 8), which is thus prevented from rotating. However, if the cup is pulled upwards against the action of the spring 75, it can be disengaged from the pin 76 and turned to permit any of the other holes to engage the pin 76. The cam plate 69 turns with the cup 73 and thus the tappet 66 can be turned into any of a number of positions about the pillar 44 so that the interval between the engagement of the pin 58 to release the first shutter blind and the engagement of the ramp 65 with the tappet 66 can be varied. The plate 74 carries a series of numbers against which a mark on the cup 73 registers to indicate the exposure for which the shutter is set.

When the ramp 65 engages the tappet 66, the latter is forced upwards, as has been already described, and presses against the under-surface of a flat horizontal member 78 which encircles the boss of the cam plate 69 and has two arms 79, 80 (Figure 8) extending horizontally towards the exposure chamber of the camera and hinged on a pin 81. The member 78 is biassed downwards against the upper surface of the cam plate 69 by a coiled spring 82 carried by the pin 81. The horizontal arm 80 has an arm 83 extending downward from the axis about which it is pivoted and, when the member 78 rests on the upper surface of the cam plate 69, the tip of this arm 83 is in the path of travel of a stop pin 84 carried by and extending from the shutter blind roller 13 and projecting eccentrically through the shutter pulley 9 which consists of an annular rim 85 joined to a central hub 86 by a single spoke 87. When the tappet 66 presses on the under surface of the member 78, this member is raised with the result that the arm 83 is moved out of the path of the stop pin 84 so that the second shutter blind 13 is then free to be drawn across the exposed surface of the film by the spring-loaded roller 16, thus terminating the exposure.

After the release of the second shutter blind 13 in this way, the disc 50 continues to rotate until the projection 51 meets an upturned nose 88 of the member 53, which projects below and in front of the arm 52 and which was moved into the path of travel of the projection 51 when the member 53 was rocked by release of the mirror 17. The mechanism is now in the position shown in Figures 5 and 8, that is to say, after an exposure has been made and before the mechanism is reset for a subsequent exposure.

To prepare the camera for a further exposure, the film 3 must be wound on, the two shutter blinds must be wound back on to the pulleys 9 and 10 and the roller 13, the spring 48 must be restressed and the projection 51 of the disc 50 once more engaged with the tip 52 of the member 53, and the mirror 17 and ground glass screen 20 restored to the position for viewing. All these operations are carried out by a single half turn of a hand winding knob 89 in the base of the instrument (see Figure 3). This knob is carried by a shaft 90 to which is secured a spur wheel 91 and a hollow drum 92 in the cylindrical wall of which is formed two diametrically opposite slots 93. The top of the drum 92 is closed by a disc 94 which has at its circumference two radial teeth 95 at diametrically opposite points. These teeth 95 limit the rotation of the drum 92 and spur wheel 91, when driven by the winding knob 89, to half a revolution, by the engagement of the hook-shaped end 96 of a bell crank 97 pivoted on a pillar 99 (Figure 6). The other arm 98 of the bell crank 97 rides on the circumference of the roller 13 being pressed against the extreme lower edge of the roller 13 by a spring 100, and this part of the roller 13 which is immediately below the part on which the blind 12 is wound, carries a small dimple-like projection 101 which presses the arm 98 in a clockwise direction, as seen in Figure 6, when an exposure is completed and both blinds have been wound towards their respective rollers 7 and 16. This has the effect of turning the bell crank 97 to disengage the hook 96 from whichever of the teeth 95 was in engagement with it, so that the drum 92 and spur wheel 91 may be turned by hand in an anti-clockwise direction as seen in Figure 6. The spur wheel 91 drives a spur wheel 102 mounted freely on the pillar 99 and having half the number of teeth of the spur wheel 91 so that when the latter is turned through half a revolution, the spur wheel 102 executes a complete revolution. This spur wheel 102 in turn, engages a spur wheel 103 of an equal number of teeth which is in turn in engagement with the spur wheel 46 formed on the bottom of the member 45 and which is the same size as the spur wheel 103. This spur wheel 46 is also in engagement with an equal spur wheel 104 on a shaft 128 to which is keyed a sprocket roller 105, which is of such diameter that one complete revolution will feed the film 3 a distance corresponding to one exposure. Referring to Figure 2, the spur wheel 103 is mounted to slide on the outer surface of a footstep 205 which forms the lower bearing for the shaft 11 to which the pulleys 9 and 10 are keyed and on which the roller 13 is free to rotate. The spur wheel 103 is urged downwards against the bottom of the body 1 by a spring 106, the upper end of which bears against a collar 107 of the footstep 205. A small wedge-shaped projection 108 is formed eccentrically on the underside of the spur wheel 103 and a socket 109 is provided in the base of the case 1 in which this projection 108 fits. However, when the spur wheel 103 is rotated anti-clockwise as seen in Figure 6, the sloping face of the projection 108 engages the edge of this depression 109 and the spur wheel 103 is cammed upwards against the spring 106 and performs a revolution in this position until the projection 108 once more reaches the recess 109. The depth of the spur wheel 103 is such that its teeth remain in engagement with both the spur wheel 102 and the spur wheel 46 during this process. When the spur wheel 103 is raised, a dog 110 on its upper surface engages a slot 111 on the underside of the pulley 10, so that the spur wheel 103 and the pulley 10 are in driving engagement. Thus in performing one revolution, the spur wheel 103 is raised to engage the pulley 10 so that the latter is also driven through one revolution and is then freed when the projection 108 once more drops into the depression 109. The pulley 10 drives the pulley 9 through the shaft 11 and the latter drives the roller 13 through the engagement of the spoke 87 with the stop pin 84 (Figure 8), so that both pulleys and the drum 13 are turned through a complete revolution and the shutter reset for a further exposure. Towards the end of this revolution, the stop pin 84 and the stop 64 on the pulley 9 move past the ends of their respective release levers 63 and 83, which are spring biassed to yield and then move in behind them, and thus prevent the release of the shutter blinds until it is brought about by the rotation of the disc 50. As soon as the spur wheel 103 begins to turn the roller 13, the projection 101 moves away from the arm 98 of the bell crank 97 so that the hooked end 96 of the latter rides on the circumference of the disc 94 until the second tooth 95 is engaged by the hook 96, thus limiting the rotation of the spur wheel 91 to half a revolution, which has the effect of limiting the rotation of the spur wheels 102, 103, 46 and 104 to a complete revolution. The drum 92 and all the associated gearing are prevented from turning backwards by a spring-loaded detent 112 which engages one of the slots 93 when the hooked end 96 of the bell crank 97 engages a tooth 95. Backward movement is also prevented by the arm 190 freely pivoted on the pillar 99 and biassed by the spring 191 so that a roller 192 carried at the free end of the arm 190 bears on the surface of the drum 92. The arrangement is such that, when the hook 96 engages either of the teeth 95, the roller 192 engages the slot 93 opposite to that engaged by the detent 112, abutting on the edge of the slot 93 to prevent clockwise rotation of the drum (as seen in Figure 6).

When the member 45 is turned through one revolution by the action of the winding knob 89, the disc 50 is prevented from rotating by engagement of the projection 51 with the nose 88 of the member 53. Thus the spring 48 is stressed by one complete turn, which is sufficient to rewind it for a further exposure. The sleeve 47 of the member 45 has a helical cam ledge 113 formed on its outer surface and extending one complete turn around the sleeve 47. When the member 45 is turned through a complete revolution, the underside of this helical ledge bears on a roller 114 carried on the pin by which the rod 41 is pivoted to the arm 29 on the mirror shaft 19. Thus in completing a revolution, the member 45 cams the mirrors 17 and ground glass screen 20 and their associated arms 28 and 29 from their upper position when the exposure is made down into the viewing position, at which point the pin 30 is engaged by the hook 31 of the member 32. At the completion of this revolution, the foot of the cam ledge 113 is in such a position as to be just clear of the roller 114 leaving the latter free to travel upwards when the mirror is released.

As the arm 29 is turned down into the viewing position by the cam 113, the pin 54 carried by the arm 29 rocks the member 53 on its pivot 53A until, at the moment when the resetting of the shutter and shutter release mechanism is completed, the turned-up nose 88 of the member 53 is lowered sufficiently to release the projection 51 of the wheel 50, which has hitherto been held by it, so that the wheel 50 is free to turn until the projection 51 butts against the tip 52 of the upper arm of the member 53, which has, by the same movement of the member 53, been turned into the path of travel of the projection 51. In this way, the shutter release mechanism is made ready for a further exposure.

As the film 3 is fed by the sprocket roller 105 during the resetting of the mechanism, it is necessary for it to be taken up in the cassette 5. This cassette is of the conventional type and carries an inner spool onto which the film is wound and the upper end of which is engaged by the usual slotted member 116A at the end of a shaft 116. This shaft carries a collar 124 and winding handle 126 and is driven by friction through spring 125 from a sleeve 120 to which a spur wheel 117 is keyed and which is journalled in a tubular sleeve 120A. The spur wheel 117 is driven through an intermediate spur wheel 117A by a spur wheel 118 secured to the upper end of the shaft 128 (Figure 7). The sleeve 120 extends through the top of the body 1 and carries a disc 121 formed with a rim 122 which has a small notched projection 123 and the ratio of the gearing between the shaft 128 and the sleeve 120 is such that for one revolution of the sprocket wheel 105, the sleeve 120 performs slightly less than one revolution so that the notched projection 123 can be arranged to register each time with a different one of a series of numbers marked on the cover plate of the camera indicating the number of the exposure. The diameter of the roll of film in the cassette 5 is always greater than the diameter of the sprocket roller 105 and thus the rotation of the spool of film is always more than adequate to take up the slack film fed by the roller 105, but the friction drive between sleeve 120 and shaft 116 allows for slip to take place.

For rewinding the film 3 into the cassette 4, a knob and winding handle 127 similar to the handle 126 is provided connected to the cassette 4 (Figure 1). To enable the film to be wound independently of the shutter mechanism, it is necessary to be able to disengage the sprocket roller 105 from the gear train by which it is driven, and, for this purpose, it is made freely rotatable on the shaft 128 to which the spur wheel 104 is secured. Normally, drive is transmitted to the sprocket roller 105 by a dog 129 on a sleeve 119 and which engages a notch 130 formed at the top of the sprocket roller 105, the sleeve 119 itself being driven by the engagement of an axial projection in a corresponding slot in the spur wheel 118. The dog 129 can be pushed out of engagement with the notch 130 by sliding the shaft 119 downwards against the action of a spring 17. This is done by pulling upwards the collar 124 and winding handle 126 so that, as will be seen in Figure 7, a collar 131 on the member 116A bears against the underside of a member 132 pivoted at 133 and having a forked end 134, which acts between two flanges 135 and 136 on the sleeve 119 so that, when the collar 124 is withdrawn, the sleeve 119 is forced downwards and the drive between the shaft 128 and sprocket roller 105 is disengaged.

The longest exposure possible with the mechanism so far described is limited by the time which the disc 50 takes to complete a revolution, and to obtain longer exposures, it is necessary to retard this disc 50 after the release of the first shutter blind 6. This is brought about by providing a mechanism comprising a flywheel 137, as seen in Figure 4, on a freely rotatable shaft 138 which carries a pinion 139. This pinion meshes with a spur wheel 140 on a shaft 142 carrying a pinion 141, and the pinion 141 in turn meshes with a spur wheel 143 on a shaft 144, which carries a pinion 145. The lower end of the shaft 144 is formed as a bearing for the top of the shaft 128 (Figure 7). The pinion 145 is engaged by a toothed arc 146 (Figures 4 and 5) carried at the end of an arm 147 pivoted at 148 and carrying approximately half way along its length a small roller 149. This roller is constrained to press against the edge of the cam plate 69 by a bowed spring 150 pivoted at 151 to the arm 147 and anchored at 152 to the frame of the camera. The cam plate 69 is so shaped that for short exposures of duration less than, for instance, one-fiftieth of a second, the tip 153 of the toothed arc 146 is held clear of engagement with any of the rotating parts of the shutter timing mechanism. For longer exposures, however, owing to the shape of the cam plate 69, the toothed arc 146 is permitted to turn under the action of the spring 150 so that the tip 153 of the arc 146 comes into the path of travel of the projection 51 of the disc 50, and the arrangement is such that this occurs after the release of the first shutter blind. Thus when this occurs, the spring 48 not only has to drive the disc 50, but also to stress the spring 150 and accelerate the train of gearing which drives the flywheel 137, the ratio of which is approximately a forty to one increase so that the speed of rotation of the disc 50 is materially retarded. The cam plate 69 is so shaped that, as the cam plate is set for slower exposures, the engagement of the projection 51 with the toothed arc 146 occurs progressively earlier in the rotation of the disc 50 and the disc 50 is, therefore, retarded to a progressively greater extent.

To make a bulb exposure in which the release of the second shutter is delayed until the trigger button 34 is released, the cam plate 69 is turned until a notch 175 (Figure 5) formed in the periphery of the cam plate 69 comes beneath the turned-down tip 154 of a member 155 pivoted on the pin 81. This member 155 has a downwardly extending arm 156 (Figures 1 and 2) which rides against a coned portion 157 of the trigger 35 so that, until the trigger is depressed, the member 155 cannot turn under the action of its spring 158 and the tip 154 cannot be turned down past the level of the cam disc 69. The member 155 also has a second downwardly extending arm 159 which lies alongside the arm 83 of the second shutter release lever and this arm 159 is normally prevented from engaging the stop of the second shutter blind roller 13 as the tip 154 of the member 155 cannot normally pass the lever of the cam plate 69, but rests on its upper surface when the trigger is depressed. However, when the notch 156 is beneath the tip 154, the latter is deprived of this support when the trigger is depressed and the spring 158 turns the tip of the arm 159 into the path of the stop 84 so that, although the second shutter release lever 83 releases this stop, it is arrested immediately by the member 159 until the time when the trigger button 34 is released. At this moment, the coned portion 157 of the trigger 35 displaces the arm 156 so that the arm 159 releases the stop 84.

The camera may be reset after each exposure without each time turning the knob 89, by providing a spring motor housed in the drum 92, which may be wound initially by turning the knob 89 and which thereafter resets the camera automatically after each exposure for instance, six or twelve exposures, as in copending application Serial Number 27,536, filed May 17, 1948.

I claim:

1. In a photographic camera, a shutter mechanism comprising first and second roller blinds which co-operate to make an exposure, individual driving springs to move said blinds during an exposure, means to set said blinds and stress said driving springs prior to an exposure, first and second means to retain said respective blinds in set condition with said driving springs stressed ready for an exposure, a spring motor, means to stress said spring motor, latch means to retain said spring motor in stressed condition, means to disengage said latch means, a release member in permanent driving connection with said spring motor and adapted to engage said first retaining means to release said first blind, an intermediate member, independent of said spring motor, co-operating with said second retaining means and engageable by said release member to disengage said second retaining means to release said second blind, and means to adjust said intermediate member to vary the point in the movement of said release member at which said release member engages said intermediate member.

2. In a photographic camera, a shutter mechanism according to claim 1, further comprising retarding means engageable by said release member to retard said release member, and means to vary the point at which said release member engages said retarding means.

3. In a photographic camera, a shutter mechanism according to claim 1, further comprising movable stop means engageable by said release member to arrest said release member after said release member has engaged said first blind retaining means and before said release member has engaged said second blind retaining means, means to effect the subsequent disengagement of said stop means, and means to retain said stop means in non-operative positive.

4. A photographic camera comprising a first shutter blind, a co-operating second shutter blind, spring loaded take up pulleys for said respective blinds, first and second let-off pulleys for said blinds, means to stress said springs of said take up pulleys and set said blinds prior to an exposure, first and second detents engageable with said respective let-off pulleys to retain said blinds in set condition, a spring motor, a normally stationary part to which one end of said spring motor is attached, a rotatable release member in driving connection with the other end of said spring motor, means to rotate said normally stationary part to stress said spring motor, a latch engageable with said release member to prevent rotation of said release member and to hold said spring motor stressed, a trigger member, means actuated by said trigger member and co-operating with said latch to disengage said latch, a dog carried by said release member and engageable with said first detent to release said first blind, cam means carried by said release member, a tappet co-operating with said second detent member and engageable by said cam means to effect release of said second blind, and means to adjust said tappet about the axis of rotation of said cam means.

5. A photographic camera according to claim 4, further comprising a sector arm engageable by said release member, pivot means for said sector arm remote from the axis of said release member, a toothed sector forming part of said sector arm, a gear train co-operating with said toothed sector, a fly wheel driven by said gear train, a return spring urging said sector arm to engage said release member, a follower secured to said sector arm, a cam surface engageable with said follower to limit the point to which said return spring can urge said sector arm, said cam surface being adjustable by said tappet adjusting means to vary the point at which said release member engages said sector arm.

6. A photographic camera according to claim 4, further comprising a bulb exposure member, a third detent connected to said bulb exposure member and engageable with said second let-off pulley to retain said second blind in set condition, a spring to urge said bulb exposure member to engage said third detent with said second let-off pulley, a cam-part of said trigger member normally engaging said bulb exposure member to hold said third detent out of engagement with said second let-off pulley, but permitting said third detent to engage said second let-off pulley when said trigger member is actuated to disengage said latch, and further means engageable by said bulb exposure member to prevent said third detent engaging said second let-off pulley, said further means being disengaged from said bulb exposure member by adjustment of said tappet adjusting means.

7. A photographic camera according to claim 4, further comprising a movable stop engageable by said release member to arrest said release member after said release member has engaged said second detent and almost completed one revolution, and means operated by said normally stationary member to move said stop out of engagement and permit said release member to complete one revolution and move into engagement with said latch on stressing said spring motor.

8. A reflex photographic camera comprising a reflex mirror mounted for movement between viewing and exposure positions, spring means to move said mirror into the exposure position, means to retain said mirror in the viewing position, first and second blinds which co-operate to make an exposure, individual driving springs to move said blinds during an exposure, means to set said blinds and stress said driving springs prior to an exposure, means to retain said blinds in set condition and said driving springs stressed ready for an exposure, an independent spring motor, means to stress said spring motor, latch means in operative connection with said mirror to retain said spring motor in stressed condition, a release member in permanent driving connection with said spring motor and engageable with said first retaining means to release said first blind, an intermediate member independent of said spring motor, co-operating with said second retaining means and engageable by said release member to effect the release of said second blind, means to adjust said intermediate member to vary the interval between the release of said first and second blinds, and means to release said mirror from the viewing position, said connection between said mirror and said latch means being such that said latch means is disengaged from said spring motor by the movement of said mirror into the exposure position.

9. A reflex photographic mirror according to claim 8, further comprising means to restore said mirror to the viewing position and restress said mirror spring, and means connecting said mirror restoring means directly to said means to stress said spring motor.

10. A photographic camera comprising a reflex mirror, a spring to move said mirror into the exposure position, means to restore said mirror to the viewing position and restress said spring, first and second shutter blinds which co-operate to make an exposure, individual driving springs to move said blinds during an exposure, first and second retaining means to retain said respective blinds set with said driving springs in stressed condition, an independent spring motor, a release member driven from one end of said spring motor and adapted to engage said first retaining means to release said first blind, an adjustable intermediate member independent of said spring motor co-operating with said second retaining means and engageable by said release member to disengage said second retaining means to release said second blind, a normally stationary member to which the end of said spring motor opposite to said release member is attached, cam means formed on said normally stationary member and engageable with said mirror restoring means, means connecting said normally stationary member to said blinds, means to drive said normally stationary member to stress said spring motor and restore said mirror and to restore said blinds to set condition with said blind driving springs stressed, means to prevent movement of said normally stationary member when said spring motor is stressed ready for an exposure, means to disengage said mirror restoring means from said cam means when said mirror is in the viewing position, means to retain said mirror in the viewing position, and means to disconnect said blinds from said normally stationary member when said blinds are in set condition.

11. A reflex photographic camera according to claim 10, further comprising means to advance a sensitive photographic film, and a permanent driving connection between said normally stationary member and said film advancing means, such that actuation of said normally stationary member, sufficient to restress said spring motor, restore said reflex mirror to viewing position, and reset said blinds, results in driving said film advancing means sufficiently to advance said film one exposure length.

MAURICE EYRE PERSSE STUDDERT.

REFERENCES CITED

The following references are of record in the file of this patent:

UNITED STATES PATENTS

| Number | Name | Date |
| --- | --- | --- |
| 1,602,483 | Freeman | Oct. 12, 1926 |
| 1,631,301 | Washington | June 7, 1927 |
| 1,963,107 | Walters | June 19, 1934 |
| 2,203,657 | Mihalyi | June 4, 1940 |
| 2,282,284 | Hineline | May 5, 1942 |
| 2,298,340 | Bradford | Oct. 13, 1942 |
| 2,338,628 | Fairbanks | Jan. 4, 1944 |